(12) United States Patent
Funke

(10) Patent No.: US 6,411,482 B1
(45) Date of Patent: Jun. 25, 2002

(54) SURGE PROTECTOR COMPRISING MEANS FOR DETECTING AND PERMANENTLY RECORDING AN OVERVOLTAGE EVENT AND PANELBOARD EMPLOYING THE SAME

(75) Inventor: James Funke, Calgary (CA)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/504,992

(22) Filed: Feb. 15, 2000

(51) Int. Cl.[7] ............................. H02H 3/20; H02H 9/00
(52) U.S. Cl. ........................................ 361/91.1; 361/58
(58) Field of Search ........................... 324/618; 361/90, 361/91.1, 91.2, 91.5, 111, 58; 307/100, 110, 112, 116, 139, 140

(56) References Cited

U.S. PATENT DOCUMENTS

| | | | | |
|---|---|---|---|---|
| 3,700,968 A | * | 10/1972 | Spies | 361/92 |
| 4,563,720 A | * | 1/1986 | Clark | 361/55 |
| 4,566,052 A | * | 1/1986 | Kammiller | 361/91.1 |
| 4,587,588 A | * | 5/1986 | Goldstein | 361/55 |
| 4,890,186 A | * | 12/1989 | Matsubara et al. | 361/58 |
| 4,912,589 A | | 3/1990 | Stolarczyk | |
| 5,204,800 A | * | 4/1993 | Wasney | 361/111 |
| 5,621,599 A | | 4/1997 | Larsen et al. | |
| 5,825,598 A | * | 10/1998 | Dickens et al. | 361/111 |
| 5,861,683 A | | 1/1999 | Engel et al. | |
| 5,886,861 A | | 3/1999 | Parry | |
| 5,982,594 A | * | 11/1999 | Huczko | 361/56 |

\* cited by examiner

Primary Examiner—Josie Ballato
Assistant Examiner—Kim Huynh
(74) Attorney, Agent, or Firm—Martin J. Moran

(57) ABSTRACT

A surge protector is for electrical connection between one or more power lines and one or more loads. The surge protector includes an input for electrical connection to the power line and an output for electrical connection to the load. A circuit electrically interconnects the output with the input for passing power therebetween. A metal oxide varistor protects the load from surges or transients on the power line. A voltage monitoring circuit detects an occurrence of an overvoltage event on the power line. A charged capacitor is shorted by the series combination of a fuse and a MOSFET switch to open the fuse and, thereby, permanently record the occurrence of the overvoltage event.

23 Claims, 3 Drawing Sheets

US 6,411,482 B1

SURGE PROTECTOR COMPRISING MEANS FOR DETECTING AND PERMANENTLY RECORDING AN OVERVOLTAGE EVENT AND PANELBOARD EMPLOYING THE SAME

BACKGROUND OF THE INVENTION

1. Field of the Invention

This invention relates generally to apparatus for monitoring the voltage between a power source and a load and, more particularly, to a surge protector employing an overvoltage monitor for a power line. The invention also relates to a panelboard having an overvoltage monitor for a power line and a circuit for protecting a load from surges or transients in the power line voltage.

2. Background Information

Typically, relatively large commercial and industrial sites (e.g., electric utilities) employ equipment to monitor their power supplies or power sources. Economies of scale permit such monitoring at affordable prices. In contrast, however, small residential and light commercial locations do not monitor their source of power due to the relatively high cost of reliable voltage monitoring.

It is known to provide a power line analyzer which records or prints power line data such as, for example, short and long term voltage surges, sags, and transients. It is believed that such recorded or printed power line data, in turn, may be erased or be discarded by the user, thereby providing only temporary storage of such events.

The vast majority of damage to residential equipment is not caused by power line harmonics or blackouts, but, instead, by overvoltages. An overvoltage is an increase of steady state voltage (and, thus, power) for several cycles (e.g., at 60 Hz, 50 Hz) to several seconds. These overvoltages are caused, for example, by normal actions of the power system in clearing faults or correcting problems elsewhere in the system.

When the voltage of the power line sufficiently exceeds (e.g., as a function of both magnitude and time) its normal operating voltage, most electrical equipment is at risk of being damaged. Small surge suppression devices, which are common in most microprocessor-based equipment, are especially at risk of damage by overvoltages. For example, due to their fast response to surges and transients (e.g., a high frequency event lasting less than one power line cycle in duration), such suppression devices may, thus, react to and then be damaged by overvoltages.

Many manufacturers market surge protection devices for residential users. In this market, manufacturers have warranties to pay for damages to household equipment in the situation where the surge protection device fails to protect the residential equipment from surges or transients. However, the manufacturers' warranties are not valid if the damage was caused by an overvoltage. Many manufacturers determine if the surge protection device was damaged. If it was damaged, then the cause is assumed to be overvoltage and the warranty does not pay for the damage. If the surge protection device was not damaged, then the warranty also does not pay for the damage.

Various known devices and arrangements protect loads from surges in power supply voltage. Generally, both series and parallel protection are employed.

There is a need for a low-cost, fast, reliable voltage monitor which can neither be reset by the end user, nor lose its memory during extended periods in the absence of power.

While various devices monitor overvoltage events, no known voltage monitoring device is suitable for such use in the residential market in combination with other residential products.

SUMMARY OF THE INVENTION

This and other needs are met by the present invention in which an overvoltage monitoring circuit of a surge protector or panelboard detects an occurrence of an overvoltage event on a power line, and a recording circuit permanently records the occurrence of the overvoltage event.

As one aspect of the invention, a surge protector for electrical connection between at least one power line and at least one load comprises: an input for electrical connection to the power line; an output for electrical connection to the load; means for electrically interconnecting the output with the input and for passing power therebetween; means for protecting the load from surges or transients on the power line; means for detecting an occurrence of an overvoltage event on the power line; and means for permanently recording the occurrence of the overvoltage event.

Preferably, the means for permanently recording further includes a capacitor and a switch, with the switch being electrically connected in series with a fuse, and with the series combination of the fuse and the switch being electrically connected in parallel with the capacitor; and the means for detecting includes means for charging the capacitor from the voltage of the power line.

As another refinement, the means for permanently recording includes means for visually indicating the overvoltage event in the presence of the voltage on the power line. Also, the means for permanently recording may include means for permanently changing from a first state to a different second state, and means for permanently recording the second state independent of subsequent power fluctuations or loss of power on the power line.

As another aspect of the invention, a panelboard for electrical connection between at least one power line and at least one load comprises: at least one enclosure; an input for electrical connection to the power line; an output for electrical connection to the load; means for electrically interconnecting the output with the input and for passing power therebetween; means for protecting the load from surges or transients on the power line; means for detecting an occurrence of an overvoltage event on the power line; and means for permanently recording the occurrence of the overvoltage event.

BRIEF DESCRIPTION OF THE DRAWINGS

A fall understanding of the invention can be gained from the following description of the preferred embodiments when read in conjunction with the accompanying drawings in which.

DESCRIPTION OF THE PREFERRED EMBODIMENTS

As employed herein, the term "surge" shall expressly include, but not be limited to, a sub-cycle disturbance in an alternating current waveform that includes a high frequency event or a sharp discontinuity of the waveform.

As employed herein, the term "transient" shall expressly include, but not be limited to, surges.

As employed herein, the term "overvoltage event" shall expressly include, but not be limited to, an increase of steady state voltage for more than one power line cycle (e.g., at 60 Hz, 50 Hz) but, otherwise, shall exclude surges and transients.

Figure 1:
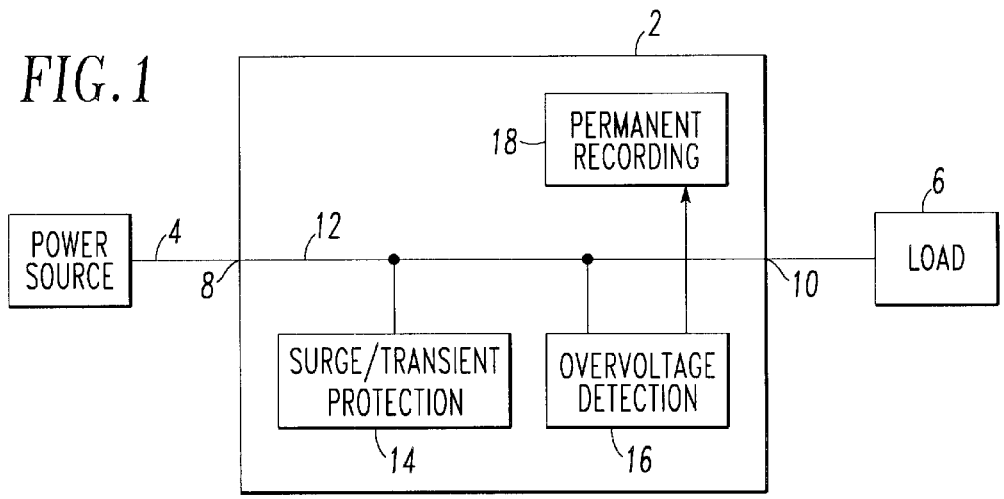
FIG. 1 is a block diagram of a surge protector in accordance with an embodiment of the present invention.

Referring to FIG. 1, a surge protector 2 for electrical connection between one or more power lines 4 and one or more loads 6 is illustrated. The surge protector 2 includes an input 8 for electrical connection to the power lines 4, an output 10 for electrical connection to the loads 6, a suitable electrical connection 12 between the input 8 and the output 10 for passing power therebetween, a circuit 14 (e.g., a metal oxide varistor (MOV)) for protecting the loads 6 from surges or transients on the power lines 4, an overvoltage detection circuit 16 for detecting an occurrence of an overvoltage event on the power lines 4, and a circuit 18 for permanently recording the occurrence of the overvoltage event.

Although parallel protection in the form of an MOV is provided in the exemplary embodiment, a wide range of surge and/or transient protection may be employed such as other forms of parallel protection (e.g., other voltage clamping devices such as zener diodes; crowbar devices such as gas discharge tubes, thyristors, silicon controlled rectifiers (SCRs), TRIACs) in which the surge current is diverted with a low impedance shunt, or series protection in which a high impedance is used in series with the load during a surge to block or limit surge current.

Figure 2:
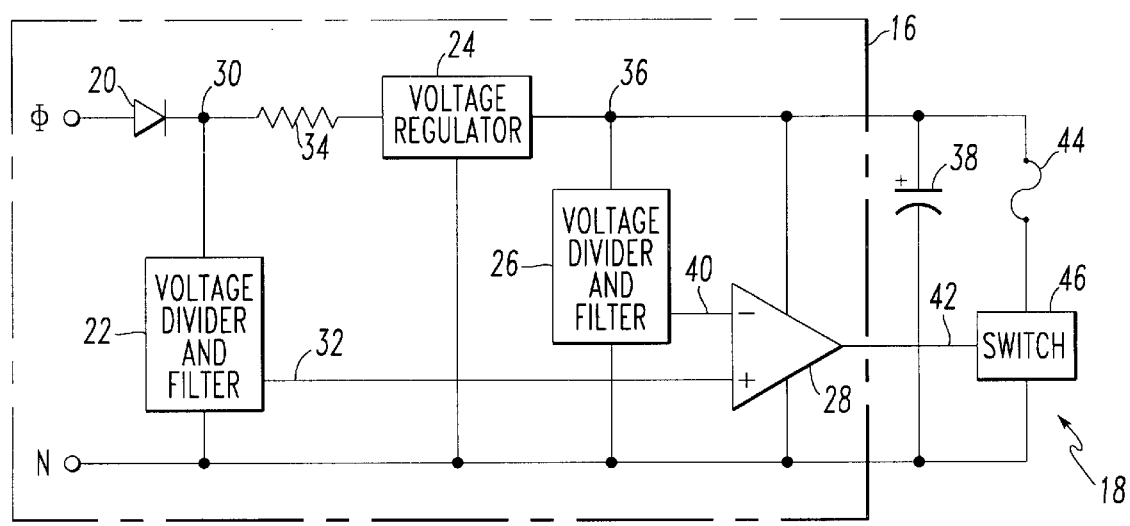
FIG. 2 is a block diagram of an overvoltage detection circuit and a permanent recording circuit for the surge protector of FIG. 1.

FIG. 2 shows the overvoltage detection circuit 16 and the permanent recording circuit 18 of FIG. 1. The exemplary circuit 16 includes a diode 20, a voltage divider and filter 22, a voltage regulator 24, a voltage divider and filter 26, and a comparator 28. In the preferred embodiment, the power line 4 of FIG. 1 includes a power leg (Φ) and a neutral conductor (N) having an alternating current (AC) voltage therebetween, although the present invention is applicable to direct current (DC) power sources. The exemplary diode 20 rectifies the AC power line voltage to provide a half-wave rectified voltage 30 to the voltage divider and filter 22, although any suitable rectifier (e.g., a diode bridge which provides full-wave rectification) may be employed. The voltage divider and filter 22 preferably provide an output signal 32 which is proportional to the peak of the input voltage. Also, the filter portion removes any fast rising transient or noise from the signal 32.

In the exemplary embodiment, a resistor 34 limits current to the voltage regulator 24, which preferably provides a relatively constant voltage 36 to the rest of the circuit 16 and to the circuit 18. Preferably, the voltage regulator 24 has suitable power to drive those circuits and, also, to provide charging current for capacitor 38 of the circuit 18.

The second voltage divider and filter 26 provide an output signal 40 which is proportional to the regulator's output voltage 36. The filter portion removes any fast rising transient or noise from the output signal 40, as well as maintaining a relatively constant delay with respect to the delay of the first voltage divider and filter 22, to prevent triggering during turn-on. Hence, a surge or transient affects both inputs (+,−) of the comparator 28 about equally. In this manner, the overvoltage detection circuit 16 is relatively immune to surges and transients which might affect the output voltage 42 of the comparator 28.

The comparator 28 compares the output signals 32, 40 of the respective first and second voltage dividers and filters 22, 26. Normally, the voltage of the second output signal 40 is higher than the voltage of the first output signal 32. Since the second output signal 40 is connected to the negative (−) input of the comparator 28, the output voltage 42 of the comparator 28 is normally low. This maintains the switch 46 of circuit 18 in an off state.

The permanent recording circuit 18 includes the capacitor 38, a fuse 44 and a suitable switch 46. The voltage regulator 24 charges the capacitor 38 from the voltage of the power line. The switch 46 is electrically connected in series with the fuse 44. The series combination of the fuse 44 and the switch 46 is electrically connected in parallel with the capacitor 38. If an overvoltage event occurs, the voltage output by the first voltage divider 22 exceeds the voltage of the second voltage divider 26. In that case, the comparator 28 changes states and provides a high output signal 42 which causes the switch 46 to turn on. Then, the energy from the capacitor 38 is dumped through the fuse 44 and the switch 46.

Thus, if an overvoltage event occurs, the voltage of the first output signal 32 exceeds the voltage of the second output signal 40, the comparator 28 changes states, and the high output signal 42 causes the switch 46 to turn on which opens the fuse 44. Otherwise, the switch 46 is off and there is no current therethrough or through the fuse 44. The voltage divider and filter 22 sense the half-wave rectified voltage 30. The circuit 16 determines an overvoltage condition when the sensed voltage 32 exceeds the reference voltage 40, with the sensed voltage 32 remaining less than the reference voltage 40 for surges or transients on the power line and, otherwise, being greater than the reference voltage 40 for the overvoltage event on the power line. Hence, the circuit 16 distinguishes between the occurrence of the overvoltage event and surges or transients on the power line.

The output signal 42 of the comparator 28 switches the switch 46 from an off state to an on state, in order that the on state electrically connects the fuse 44 in parallel with the capacitor 38 in order to permanently open the fuse 44. The energy (i.e., in the form of the electric field, $E=\frac{1}{2}CV^2$) from the capacitor 38 is then dumped as current through the fuse 44 and the switch 46, and the fuse 44 permanently changes from a first closed state to an open second state. In this manner, the fuse 44 permanently records that open state independent of subsequent power fluctuations or loss of power on the power line. Otherwise, when there is no overvoltage event on the power line, the voltage of the first signal 32 remains less than the voltage of the second reference signal 40 for surges or transients on the power line.

Figure 3:
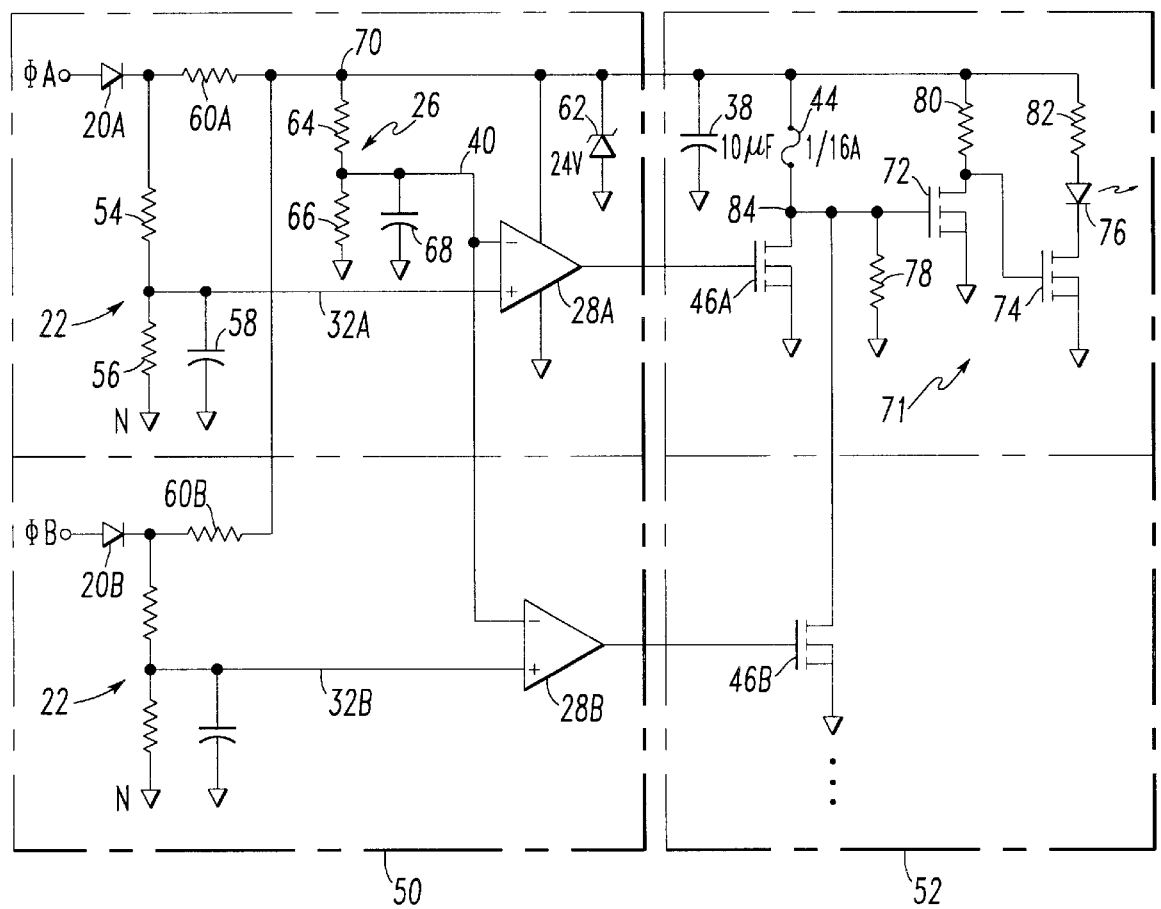
FIG. 3 is a block diagram in schematic form of an overvoltage detection circuit and a permanent recording circuit in accordance with another embodiment of the invention.

Referring to FIG. 3, an overvoltage detection circuit 50 and a permanent recording circuit 52 for a plurality of power legs ΦA,ΦB are shown. For each of these power legs, a voltage divider and filter 22 include (as shown with power leg ΦA) a first resistor 54 in series with a second resistor 56, and a capacitor 58 in parallel with the second resistor 56. The voltage 32A, which is applied to the positive (+) input of the comparator 28A, is across the parallel combination of the capacitor 58 and the second resistor 56.

The overvoltage detection circuit 50 also includes a suitable voltage regulator formed by a resistor 60A and a zener diode 62. In the exemplary embodiment, a 24V zener diode 62 is employed, although the invention is applicable to a wide range of such voltages. Although the exemplary capacitor 38 is shown as being part of the permanent recording circuit 52, it will be appreciated that such capacitor may include one or more parallel capacitors of one or both of the circuits 50 and/or 52.

The second voltage divider and filter 26 provide the second reference voltage 40 to the negative (−) inputs of the comparators 28A, 28B for each of the power legs ΦA,ΦB. The divider and filter 26 include a first resistor 64 in series with a second resistor 66. A capacitor 68 is in parallel with the second resistor 66, with the second reference voltage 40 being across the parallel combination of the capacitor 68 and resistor 66. The zener diode 62 is in parallel with the series combination of the resistors 64, 66, with the cathode of the zener diode 62 being electrically connected to the resistor 64 at node 70. The resistor 60A is electrically interconnected between the cathode of diode 20A at the input for power leg ΦA, and the cathode of zener diode 62. Similarly, the resistor 60B is electrically interconnected between the cathode of diode 20B at the input for power leg ΦB, and the cathode of zener diode 62. Hence, one or both of the power legs may power the circuits 50, 52.

For example, the exemplary zener diode 62 is a 24 V zener, the exemplary capacitor 38 is 10 μF, and the exemplary fuse 44 is rated at 1/16 A. Although not shown, a relative small resistance may be electrically connected in series with the fuse 44 and MOSFET 46A. In the exemplary embodiment, the fuse 44 functions as a memory element. Initially, the fuse 44 is closed and, thus, may conduct current. As long as this remains the case, there has been no overvoltage event. Otherwise, when the MOSFET switch 46A is on, and with suitable selection of the components, the resulting relatively high current from the capacitor 38 causes the fuse 44 to open. Hence, the fuse state permanently changes (i.e., from closed to open) and cannot be reset. In this regard, the fuse 44 is preferably employed in a manner which prohibits (e.g., without limitation, potted, sealed, soldered in place) or discourages (e.g., with a label stating that unauthorized repair voids the warranty) replacement of the same by a user.

Preferably, the voltage across the MOSFET 46A is monitored to provide a visual indication of the presence or absence of the overvoltage event. The exemplary permanent recording circuit 52 includes a monitoring circuit 71 having MOSFETs 72, 74, light emitting diode (LED) 76, and resistors 78, 80, 82. Normally, the voltage at node 84 is the same as the voltage of the zener diode 62, which is dependent upon the presence of the voltage on the power line. In that case, the MOSFET 72 is on, the MOSFET 74 is off, and the LED 76 is off. Otherwise, after an overvoltage event, the voltage at node 84 is about zero volts, the MOSFET 72 is off, the MOSFET 74 is on, and the LED 76 is turned on.

The portion of the overvoltage detection circuit 50 for the second power leg ΦB includes the diode 20B, resistor 60B, the voltage divider and filter 22, the comparator 28B, and the MOSFET 46B. The voltage divider and filter 22 output voltage 32B, which is applied to the positive (+) input of the comparator 28B. The comparator 28B, in turn, controls the MOSFET 46B, which is electrically connected in parallel with the MOSFET 46A. In this manner, an overvoltage event on one or both of the phase legs ΦA, ΦB may be detected, permanently recorded by fuse 44, and/or visually displayed by LED 76. Although two exemplary phase legs are shown, the invention is applicable to one, two, three or more phases.

Figure 4:
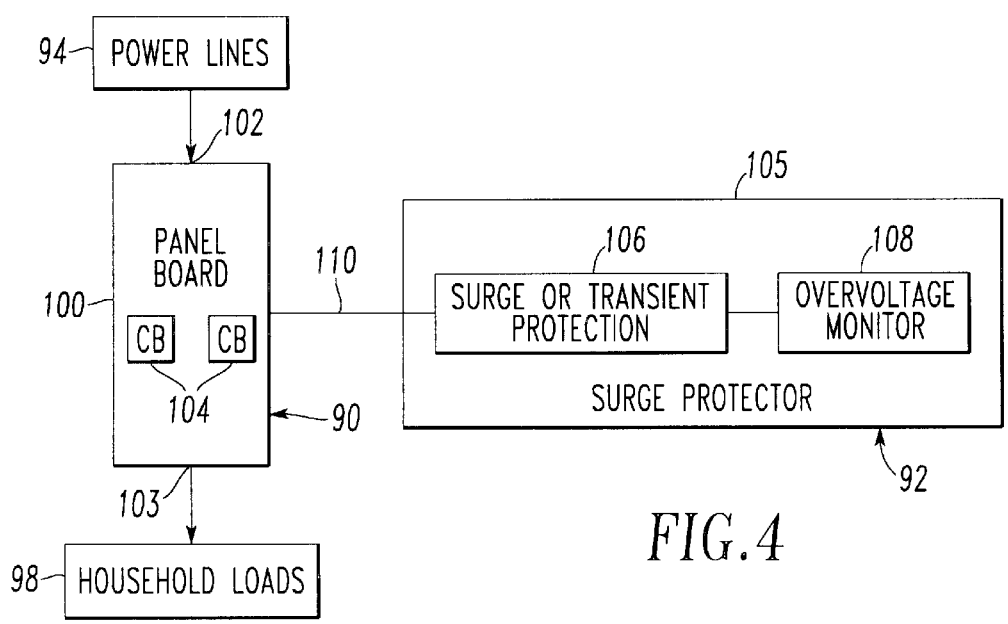
FIG. 4 is a block diagram of a panelboard and a surge protection device in accordance with another embodiment of the invention.

FIG. 4 shows a panelboard 90 and a surge protection device 92 in accordance with an embodiment of the invention. The panelboard 90 is for electrical connection between a plurality of power lines 94 and a plurality of loads, such as the exemplary household loads 98. An example of a panelboard for at least one power line and a plurality of loads is disclosed in U.S. Pat. No. 5,861,683, which is incorporated by reference herein. As is well known in the art, the panelboard 90 includes an enclosure 100, an input 102 for electrical connection to the power lines 94, and output 103 for electrical connection to the loads 98. As discussed below in connection with FIG. 7B, the panelboard 90 includes a plurality of circuit breakers (CBs) 104 for electrically interconnecting the output 103 with the input 102 and for passing power therebetween.

In the exemplary embodiment, a second enclosure 105 is provided for the surge protection device 92, which includes a suitable circuit 106 for protecting the loads 98 from surges or transients on the power lines 94, and an overvoltage monitor 108. The exemplary overvoltage monitor 108, which is similar to the circuits 50 and 52 of FIG. 3, detects an occurrence of an overvoltage event on the power lines 94 and permanently records the occurrence of the overvoltage event. Preferably, the CBs 104 are housed by the first enclosure 100, and the surge protection device 92, which includes circuit 106 and overvoltage monitor 108, is housed by the second enclosure 105, which is external to the first enclosure 100. Preferably, a suitable electrical connection 110 (e.g., wires, other suitable conductors) is provided to electrically connect the power line legs and neutral (and/or ground) from the panelboard 90 to the surge protection device 92. Alternatively, the second enclosure 105 may be housed within the first enclosure 100.

Figure 5:
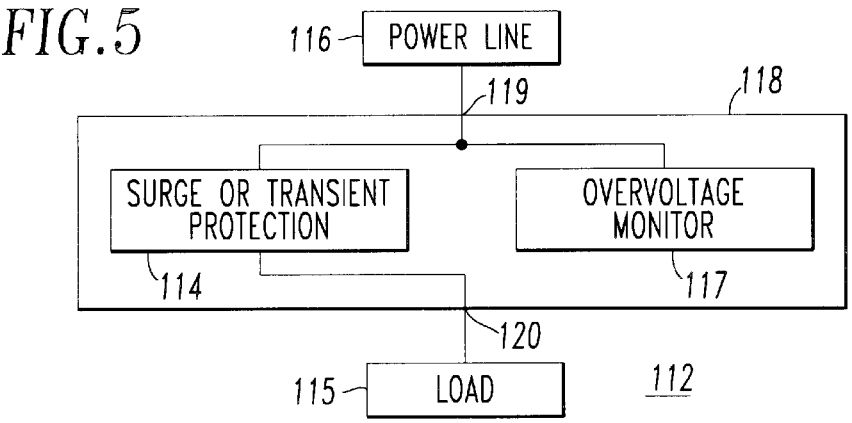
FIG. 5 is a block diagram of a surge protection and voltage monitoring device in accordance with another embodiment of the invention.

Referring to FIG. 5, a surge protection and voltage monitoring device 112 is shown. The device 112 includes a suitable circuit 114 for protecting a load 115 from surges or transients on the power line 116, and an overvoltage monitor 117, which is similar to the circuits 50 and 52 of FIG. 3. The overvoltage monitor 117 detects an occurrence of an overvoltage event on the power line 116 and permanently records the occurrence of the overvoltage event. Preferably, an enclosure 118 provides an input 119 from the power line 116 and an output 120 to the load 115, and houses the circuit 114 for protecting the load 115 and the overvoltage monitor 117.

Figure 6:
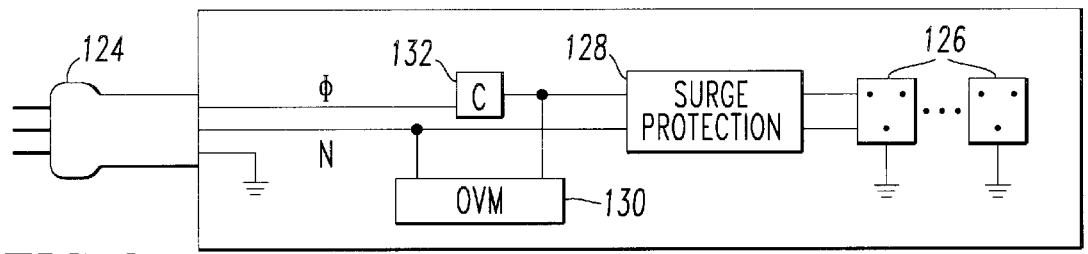
FIG. 6 is a block diagram of a surge protection and voltage monitoring device in accordance with another embodiment of the invention.

FIG. 6 shows another exemplary surge protection and voltage monitoring device in the form of a surge strip 122. The surge strip 122 has a male plug 124 for electrical connection to a power line (not shown) and one or more female plugs 126 for electrical connection to loads (not shown). The surge strip 122 includes a suitable circuit 128 for protecting the loads from surges or transients on the power line, and an overvoltage monitor (OVM) 130, which is similar to the circuits 50 and 52 of FIG. 3. The OVM 130 detects an occurrence of an overvoltage event on the power line and permanently records the occurrence of the overvoltage event.

Figure 7A:
FIGS. 7A–7D are block diagrams of various electrical connections employed by the surge protection and voltage monitoring device of FIG. 6.
Figure 7B:
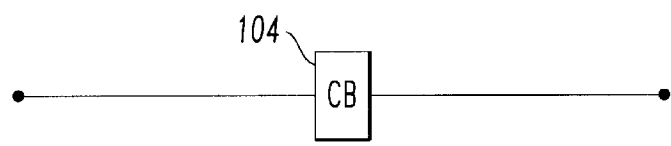
Figure 7C:
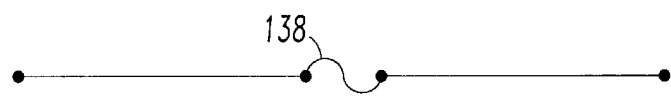
Figure 7D:
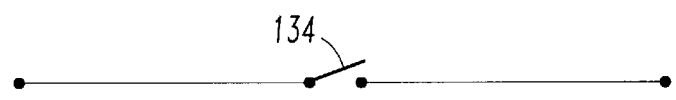

In this embodiment, the exemplary OVM 130 is included as part of a home surge protector 122. By monitoring for overvoltage events, the exemplary OVM 130 removes some of the potential liability associated with any warranty which may be offered to users of the home surge protector 122 for damage to downstream equipment caused by surges or transients. Hence, an overvoltage event, which might cause damage to any downstream electrical equipment, is readily detected, thereby precluding warranty claims for damage caused by mere surges or transients. Typically, the electrical connection (C) 132 between the power line leg ($\Phi$) and the surge protection circuit 128 (e.g., an MOV) is provided by a switch 134 (as shown in FIG. 7D). Alternatively, as shown in FIGS. 7A, 7B and 7C, various other types of electrical connections may be employed, such as, for example, a direct electrical connection 136 between the input and the surge protection circuit 128, the CB 104, and a fuse 138, respectively.

The exemplary surge protectors 2, 92, 112, 122 employ a voltage monitoring circuit which monitors an AC power line and determines if an overvoltage event has occurred. It then changes state and permanently records the overvoltage event without regard to subsequent power fluctuations or loss of power. Preferably, a separate visible indication of the overvoltage event is provided.

The exemplary voltage monitoring circuit has a relatively low cost and adds minimal, if any, cost to the end user price of the exemplary surge protectors and panelboards. This circuit monitors for overvoltages that might damage downstream equipment but cannot be stopped by conventional surge or transient protection. Otherwise, the exemplary voltage monitoring circuit is not triggered during actual surge, transient or low voltage events.

The exemplary voltage monitoring circuit fits into the cost and size structure of the residential market. By employing the voltage from the power line, there is no need for an external power supply. Preferably, the voltage monitoring circuit is integrally mounted along with a suitable surge and/or transient protection device.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A surge protector for electrical connection between at least one power line and at least one load, said surge protector comprising:
    an input for electrical connection to said power line;
    an output for electrical connection to said load;
    means for electrically interconnecting said output with said input and for passing power therebetween;
    means for protecting said load from surges or transients on said power line;
    means for detecting an occurrence of an overvoltage event on said power line; and
    means for permanently recording said occurrence of said overvoltage event without interrupting said power passing between said input and said output.

2. The surge protector as recited in claim 1, wherein said means for permanently recording includes a fuse which permanently changes from a closed state to an open state.

3. The surge-protector as recited in claim 2, wherein said power line has a voltage; wherein said means for permanently recording further includes a capacitor and a switch, with the switch being electrically connected in series with the fuse, and with the series combination of the fuse and the switch being electrically connected in parallel with the capacitor; and wherein said means for detecting includes means for charging said capacitor from the voltage of said power line.

4. The surge protector as recited in claim 3, wherein said means for detecting includes means for switching said switch from an off state to an on state, in order that said on state electrically connects the fuse in parallel with the capacitor in order to permanently open the fuse.

5. The surge protector as recited in claim 1, wherein said power line has a voltage; and wherein said means for detecting includes:
    means for dividing and filtering the voltage of said power line to provide a first voltage;
    means for providing a second reference voltage;
    means for comparing said first voltage and said second reference voltage and detecting said occurrence of said overvoltage event when said first voltage exceeds said second reference voltage.

6. The surge protector as recited in claim 5, wherein said means for dividing and filtering includes a first resistor in series with a second resistor, and a capacitor in parallel with the second resistor, with said first voltage being across the parallel combination of the capacitor and the second resistor.

7. The surge protector as recited in claim 5, wherein said means for providing a second reference voltage includes a voltage regulator powered by said power line.

8. The surge protector as recited in claim 5, wherein said means for providing a second reference voltage includes:
    a first resistor in series with a second resistor,
    a capacitor in parallel with the second resistor, with said second reference voltage being across the parallel combination of the capacitor and the second resistor,
    a zener diode in parallel with the series combination of the first resistor and the second resistor, said zener diode having a cathode electrically connected to said first resistor, and
    a third resistor electrically interconnected between said input and said first resistor and the cathode of said zener diode.

9. The surge protector as recited in claim 8, wherein said second reference voltage is normally greater than said first voltage, and wherein said first voltage remains less than said second reference voltage for surges or transients on said power line and is greater than said second reference voltage for said overvoltage event on said power line.

10. The surge protector as recited in claim 5, wherein the voltage of said power line is an alternating current (AC) voltage; and wherein said means for detecting further includes means for rectifying the AC voltage to provide a rectified voltage to said means for dividing and filtering.

11. The surge protector as recited in claim 1, wherein said surge protector is a surge strip having a male plug for electrical connection to said power line and at least one female plug for electrical connection to said load.

12. The surge protector as recited in claim 1, wherein said input includes means for electrically connecting to a panelboard.

13. The surge protector as recited in claim 1, wherein said means for electrically interconnecting said output with said input is selected from the list including: (a) a circuit breaker, (b) a fuse, (c) a switch, and (d) a first direct electrical connection between said input and said means for protecting, and a second direct electrical connection between said means for protecting and said output.

14. The surge protector as recited in claim 1, wherein said power line has a voltage; and wherein said means for permanently recording includes means for visually indicating said overvoltage event in the presence of the voltage on said power line.

15. The surge protector as recited in claim 1, wherein said means for protecting includes a metal oxide varistor.

16. The surge protector as recited in claim 1, wherein said power line has a voltage with a peak; and wherein said means for detecting includes means for distinguishing between said occurrence of said overvoltage event and said surges or transients on said power line, said means for distinguishing comprising a first voltage divider having an input electrically connected with said power line and an output; a first filter electrically connected with the output of said first voltage divider, said first voltage divider and said first filter cooperating to provide a first output having a signal which is proportional to the peak of the voltage of said power line; a voltage regulator having an input electrically connected with said power line and an output having a voltage; a second voltage divider having an input electrically connected with the output of said voltage regulator and an output; a second filter electrically connected with the output of said second voltage divider, said second voltage divider and said second filter cooperating to provide a second output having a signal which is proportional to the voltage of the output of said voltage regulator; and a comparator having a first input electrically connected to said first output, a second input electrically connected to said second output, and an output having a signal representing said occurrence of an overvoltage event on said power line.

17. The surge protector as recited in claim 1, wherein said means for permanently recording includes means for permanently changing from a first state to a different second state.

18. The surge protector as recited in claim 17, wherein said means for permanently recording includes means for permanently recording said second state independent of subsequent power fluctuations or loss of power on said power line.

19. A panelboard for electrical connection between at least one power line and at least one load, said panelboard comprising:

at least one enclosure;

an input for electrical connection to said power line;

an output for electrical connection to said load;

means for electrically interconnecting said output with said input and for passing power therebetween;

means for protecting said load from surges or transients on said power line;

means for detecting an occurrence of an overvoltage event on said power line; and means for permanently recording said occurrence of said overvoltage event without interrupting said power passing between said input and said output.

20. The panelboard as recited in claim 19, wherein said at least one power line includes a first power line leg and a second power line leg; and wherein said means for detecting includes means for monitoring said first and second power line legs.

21. The panelboard as recited in claim 19, wherein said at least one enclosure includes a first enclosure and a second enclosure; wherein said means for electrically interconnecting is housed by the first enclosure; and wherein said means for protecting, said means for detecting and said means for permanently recording are housed by the second enclosure.

22. The panelboard as recited in claim 21, wherein the second enclosure is external to the first enclosure.

23. The panelboard as recited in claim 19, wherein said power line has a voltage; and wherein said means for detecting includes means for sensing said voltage, means for comparing said sensed voltage to a reference voltage and for determining an overvoltage condition when said sensed voltage exceeds said reference voltage, with said sensed voltage remaining less than said reference voltage for surges or transients on said power line and being greater than said reference voltage for said overvoltage event on said power line.

* * * * *